United States Patent [19]
Kinard et al.

[11] Patent Number: 5,740,295
[45] Date of Patent: Apr. 14, 1998

[54] LOW FIBER COUNT OPTICAL CABLE

[75] Inventors: Michael Douglas Kinard, Lawrenceville; Andrew John Panuska, Buford; Parbhubhai Dahyabhai Patel, Dunwoody; Walter Joseph Paucke, Tucker, all of Ga.

[73] Assignee: Lucent Technologies Inc., Murray Hill, N.J.

[21] Appl. No.: 333,197

[22] Filed: Nov. 2, 1994

[51] Int. Cl.$^6$ ............................................. G02B 6/44
[52] U.S. Cl. ........................ 385/109; 385/103; 385/106; 385/113; 385/114
[58] Field of Search ..................... 385/109, 100–114

[56] References Cited

U.S. PATENT DOCUMENTS

| | | | |
|---|---|---|---|
| 4,078,853 | 3/1978 | Kempf et al. | 350/96.23 |
| 4,743,085 | 5/1988 | Jenkins et al. | 350/96.23 |
| 4,744,631 | 5/1988 | Eichenbaum et al. | 350/96.23 |
| 4,856,867 | 8/1989 | Gaylin | 350/96.23 |
| 5,015,063 | 5/1991 | Panuska et al. | 350/96.23 |
| 5,020,875 | 6/1991 | Arroyo et al. | 350/96.23 |
| 5,109,457 | 4/1992 | Panuska et al. | 385/102 |
| 5,125,063 | 6/1992 | Panuska et al. | 385/113 |
| 5,189,718 | 2/1993 | Barrett et al. | 385/101 |
| 5,224,192 | 6/1993 | Wagman | 385/109 X |
| 5,345,526 | 9/1994 | Blew | 385/100 |
| 5,388,175 | 2/1995 | Clarke | 385/109 X |

*Primary Examiner*—Phan T. H. Palmer

[57] ABSTRACT

A family of low optical fiber count cables which contains either optical fiber bundles, buffered fibers, or ribbon fibers housed in a core tube whose inner diameter is optimized for a cable containing two buffered fibers. The unoccupied volume of the core tube is filled with a water blocking material and the exterior surface of the core tube is coated with a hydrophilic material applied directly thereto. The core tube is encased in a dielectric jacket or in a metallic jacket. The cables thus formed can be used in a composite cable which includes an electrically conducting cable, and two abutting cables are incased in an outer sheath or jacket, forming a FIG. 8 configuration.

26 Claims, 4 Drawing Sheets

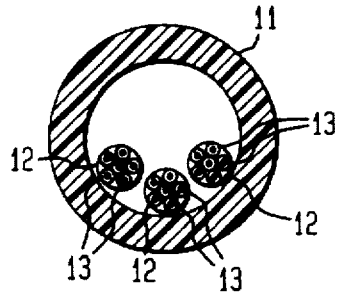
FIG. 1A
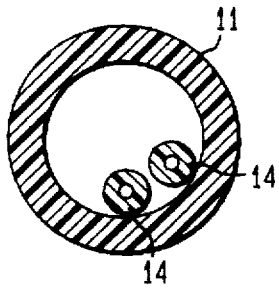
FIG. 1B
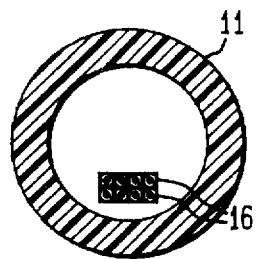
FIG. 1C
FIG. 2
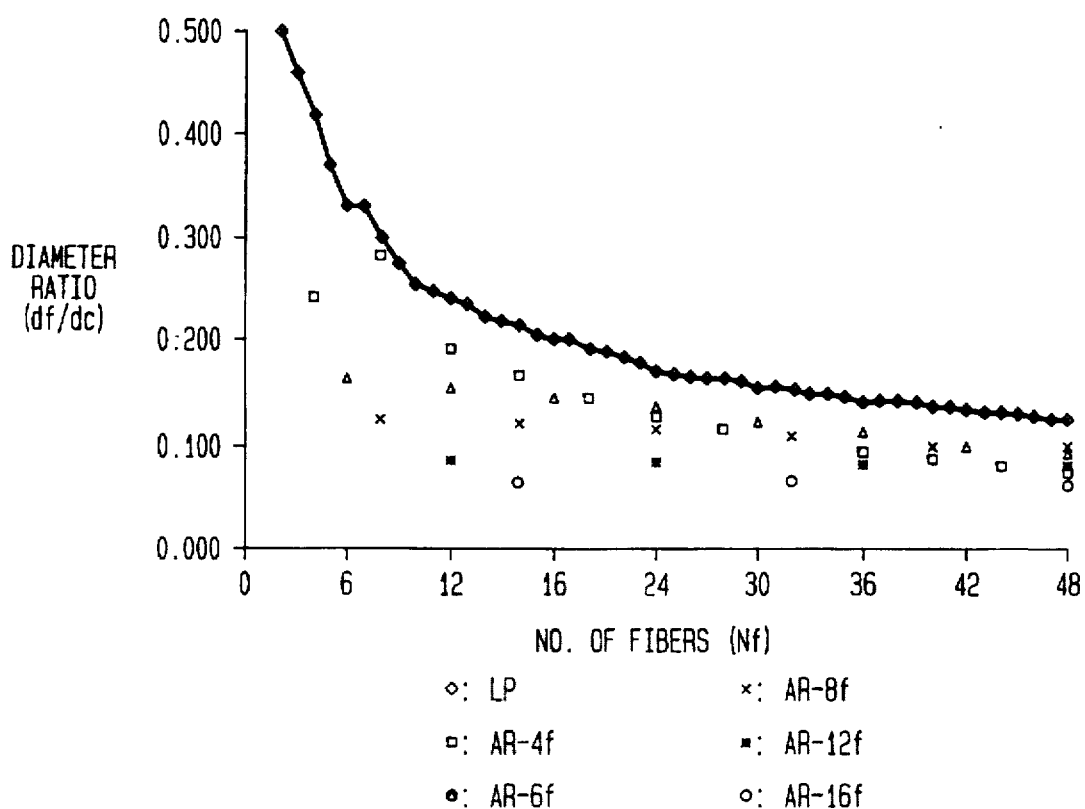

LOW FIBER COUNT OPTICAL CABLE

FIELD OF INVENTION

This invention relates to optical fiber cable and, more particularly, to a low fiber count cable configuration adaptable for use with a variety of fiber core options.

BACKGROUND OF THE INVENTION

The use of optical fibers in communications signal transmission is widespread today, and is increasingly replacing traditional signal transmission means, such as coaxial cable and twisted pairs. Optical fibers have the advantages of large signal bandwidths and relatively small size and light weight, but these very advantages give rise to problems inherent in the nature of the fibers themselves. Optical fibers generally and primarily consist of glass or other low ductility material, and are, invariably, mechanically very fragile, characterized by low strain fracture, especially under tensile loading. This inherent fragility further leads to a degradation of the light signal transmission when the fiber or fibers are bent, which is generally referred to as macro and micro bending loss. In addition, an optical fiber cable must include strength members that, generally, are not involved in signal transmission but help limit the strain on fibers, whereas in metallic conductor cables, such as coaxial cables, the metallic signal conductors are often strength members also, or vice versa.

In U.S. Pat. No. 5,125,063 of Panuska et al., there is shown a lightweight optical fiber cable which substantially overcomes the problems set forth in the foregoing. The cable itself is a low fiber count structure having a loose fiber bundle enclosed within a core tube, which, in turn, is wrapped in water blocking tape. Externally situated relative to the wrapped core tube is a pair of strength members of suitable material such as, for example, metallic or glass rods, and the entire assembly is enclosed in an outer jacket of suitable plastic material. Panuska et al. address the problem of tensile strain and macro and micro bending by having a predetermined excess length of fiber within the core tube sufficient to avoid undue strains on the fiber as the core tube is exposed to environmental forces, primarily tensile and bending, imparted to the cable during installation. While excess fiber length within the core tube diminishes tensile forces on the fiber, the excess length must not be so great as to result in excessive or too sharp a curvature i.e., too small a bend radius, of the fiber, which usually is in the form of helical or sinusoidal configuration within the core tube nor should the fiber be forced to bear against the interior wall of the core tube.

In U.S. Pat. No. 5,015,063 of Panuska et al. there is shown an optical fiber cable core comprising at least one bundle of optical fibers enclosed within a core tube wherein the excess length of each fiber is such that undue strains on the fibers are avoided during handling, installation, and use. The inventors recognize that there is an interrelationship among the excess fiber length, the inner diameter (ID) of the core tube, the lay length of the fiber, and the bend radius thereof, and determine that an excess fiber length of approximately one percent (1%) may be used without causing unacceptable losses. The core tube with the fibers contained therein is preferably filled with a water blocking filling material such as a colloidal gel. It is also suggested in the patent that, as an alternative to the water blocking gel, or in conjunction therewith, a water blocking tape or yarn may be used in a manner similar to that shown in the aforementioned U.S. Pat. No. 5,125,063 patent.

The aforementioned patents are directed primarily to cables comprising loose fiber bundles, although U.S. Pat. No. 5,015,063 also refers to ribbon fiber configurations. However, in the prior patents, different values of excess fiber length are called for different fiber configurations which include, in addition to the foregoing, a buffered fiber configuration. Thus, there is the necessity of tailoring the core tube inner diameter and the excess fiber length to the particular fiber configuration to be used, which is undesirable from an economic standpoint as well as simply a convenience standpoint. In addition, as noted hereinbefore, the prior art discloses the use of water blocking tape, generally longitudinally or spirally wound along the length of the core tube which can represent an added expense, both for the cost of the tape and for the production step of wrapping it around the core tube. In addition, tapes can result in an undesirable increase in cable diameter.

Local exchange carriers (LEC's) and cable TV (CATV) companies are deploying networks that deliver both voice and broadband services, using various combinations of optical fiber, copper, and coaxial cable media. One desideratum is the extension of the optical fiber up to the customer premises, an architecture referred to as fiber-to-the-curb (FTTC) or fiber-to-the-home (FTTH). That portion of the network involved in large scale distribution utilizes high fiber count cables which have been optimized for best performance regardless of end use. However, the diversity of provider needs and preferences in forming the link between the distribution cables and the customer have, heretofore, been met by tailoring the cables for that link to the particular desired architecture. Such a solution requires a family of cables of different configurations depending on the provider's needs. Thus, the various options include miniature armored and dielectric drop cables, composite cables which include coax and copper service wires, and, for the optical portion, unbuffered fibers, buffered fibers, and miniature fiber ribbons. At the present time, fiber/coaxial composite cables are contemplated for use in fiber-to-the-home (FTTH) arrangements for delivering voice, data, cable TV, and interactive broadband services to the subscribers or user's home.

It is desirable, therefore, to have an optical fiber cable that exhibits a high degree of diversity in its fiber configuration without the economically costly necessity of tailoring the cable size and structure, as well as the fibers, to a particular use.

SUMMARY OF THE INVENTION

The present invention encompasses a family of low fiber count cables for use in broadband networks. Thus, the cable may contain optical fiber bundles, buffered optical fibers, or ribbon fibers, or some combinations thereof, wherein a common core tube of optimum diameter and cross-sectional area is used. To this end, and as will be discussed more fully hereinafter, the cable of the invention comprises, in its basic configuration, a core tube of optimized size containing one or more of the above fiber assemblies with a packing density and fiber excess length that is optimized for the fiber assembly. The remaining core tube volume is filled with a suitable water blocking compound such as, for example, a colloidal gel which, in addition to its water blocking function, maintains the optical fibers in a low stress state to minimize signal attenuation.

In accordance with one aspect of the invention, the exterior surface of the core tube is coated with a hydrophilic powdery material which is deposited directly onto the core tube. The hydrophilic material is of the type known as "superabsorbents" which can absorb and retain water without dissolution in the water. In a first preferred embodiment of the invention, the core tube is surrounded by tubular armor member which may be, for example, electrolytically chrome coated steel, with the hydrophilic powder sandwiched therebetween. First and second strength members extend along the exterior of the armor member and the exterior of the armor member is coated with hydrophilic powder material. The entire assembly is encased in a sheath or jacket of polyethylene. The hydrophilic powder has the property of swelling as it absorbs moisture, thereby forming a water block between the core tube and the armor and between the armor and the polyethylene jacket so that water is effectively prevented from traveling along the length of the cable interior. Thus, the combination of the colloidal gel filling material and the hydrophilic powder material substantially completely blocks the migration or flow of water along the cable.

In the second preferred embodiment of the invention, first and second epoxy impregnated fiberglass rods are spirally or helically disposed along the length of the coated exterior of the core tube, and a plurality of flexible fiberglass rovings, preferably matrix impregnated, are also spirally wound along the length of the cable. The entire assembly is encased in a preferably polyethylene jacket or sheath. Thus, as in the first embodiment, the combination of the colloidal gel filling material and the hydrophilic powder forms a water block to prevent water from traveling along the length of the cable.

Both the first and second embodiments of the invention can be combined with twisted pair or coaxial cable and sheathed in a figure eight configuration to produce a composite cable which satisfies a customer's optical and electrical requirements in a single cable.

The features and advantages of the present invention will be more readily apparent from the following detailed description read in conjunction with the accompanying drawings.

DESCRIPTION OF THE DRAWINGS

FIGS. 1A, 1B, and 1C are cross-sections of the alternative optical fiber arrangements for use with the invention;

FIGS. 2, 3, and 4 are graphs of certain parametric relationships for use in optimizing certain of the dimensions of the cable of the invention;

DETAILED DESCRIPTION

Figure 3:
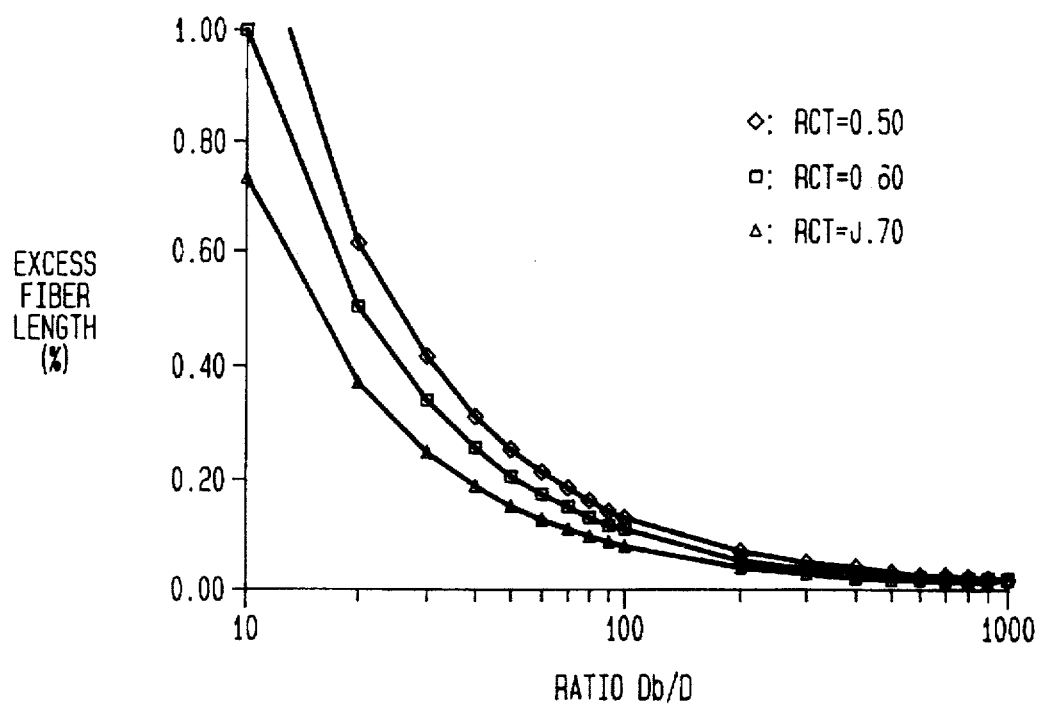

The present invention is primarily directed to cables which have the following characteristics:

1—flexible core configurations
2—low fiber counts
3—convenient fiber drop capability
4—ease of interconnections
5—increased handling capacity
6—low installed cost The principles of the present invention are embodied in a family of low fiber count cables specifically engineered for broadband local area networks and having the foregoing characteristics. As will be discussed more fully hereinafter, the entire family of products utilizes an optimized common core tube to enhance manufacturing efficiency while offering a variety of fiber core configurations and sheath options.

In any optical fiber cable, it is desired that the design of the cable is such that lowest possible attenuation change is achieved without compromising reliability. One of the key parameters in such cables is strain in the fiber, which, in turn, is governed by the packing density within the core tube; the excess fiber length; fiber unit stranding or twisting; cable bending; and tensile load rating. Packing density is defined as the ratio of the total fiber unit area to the total core area within the core tube and is expressed in percent. High packing density is desired for cost effectiveness, but too high a packing density leads to higher strains and, consequently, higher attenuation. For the highest packing density, a critical dimension is the minimum diameter $d_c$ that circumscribes all of the fibers. A common core tube for use with stranded fibers, buffered fibers, or fiber ribbons therefore places limits on the allowable packing density. A loose fiber bundle, i.e., stranded fiber offers higher packing density than either the buffered fiber design or the ribbon fiber design, but it has been found that a core tube having an inside diameter that gives an optimum, or near optimum, packing density for buffered fibers also gives a packing density for fiber bundles and ribbon fibers that is near optimum. With the use of such an optimized core tube, up to eighteen 250 micron stranded fibers, up to two 900 micron PVC buffered fibers, up to three four fiber ribbons, or up to two six fiber ribbons can be accommodated, and the optimum packing density is achieved. By optimum packing density is meant a maximum packing density commensurate with excellent optical and mechanical performance, including low strain and attenuation.

In FIGS. 1A, 1B, and 1C are shown three of the aforementioned options. In FIG. 1A, a core tube 11 of a suitable polymeric material such as polypropylene, has an optimized inside diameter (ID) which is determined as discussed hereinafter and an outside diameter (OD) of approximately 4 mm. Contained within tube 11 are three fiber bundles 12 of six 250 micron fibers 13,13 each for a total of eighteen fibers. In the completed cable, the remainder of the interior volume of the core tube will be filled with a suitable water blocking material, not shown. In FIG. 1B, core tube 11 contains therein two 900 micron PVC buffered fibers 14, and in FIG. 1C core tube 11 has two four fiber ribbons 16 contained therein. In the arrangement of FIG. 1A, the dimension $d_c$ is that diameter which surrounds all of the fiber bundles. In FIG. 1B, $d_c$ is twice the diameter of a buffered fiber. In FIG. 1C the value of $d_c$ is equal to the diagonal of the rectangular ribbon stack.

The second parameter affecting strain is, as noted before, excess fiber length. Excess fiber length, i.e., the contained fiber is actually longer than the core tube that contains it, is also an important parameter in optimizing the core tube ID. Too little excess fiber length can result in potentially damaging tensions being placed on the fiber when the cable is bent or extended. On the other hand, a large excess fiber length can help reduce tensile forces on the fiber from cable bending or extension and/or reduce tensile stiffness requirements of the cable, but too large an excess fiber length may induce bending strain in the fiber. Thus, where the fiber is contained within the core tube in the configuration of a sinusoid or helix, for a core tube of given size, an optimum excess length must be determined. Beyond that length, the radius of curvature of the fiber becomes too small, resulting in increased bending strains and attenuation. Both the packing density and the excess fiber length are interrelated and determinative of the inside diameter of the core tube to a large extent.

Excess fiber length $l_e$ in percent can be determined to a good approximation from the relationship $$l_e = 100[(1 + k^2)^{1/2}\{1 - p\} - 1] \quad (1)$$

$$\text{where } p = \frac{1}{4} q^2 + \frac{3}{64} q^4 + \frac{1}{256} q^6 + \ldots$$

$$\text{where } q^2 = \frac{k^2}{1 + k^2}$$

$$\text{and } k^2 = \frac{1 - (d_c/D)}{D_b/D}$$

where $d_c$ is the critical dimension, $D_b$ is twice the fiber bending radius or bending diameter within the core tube, and D is the inside diameter of the core tube.

The relationship of the various parameters involved in the design of the present invention, in terms of bending strain, is given by $$\epsilon_b (\%) = 100 \frac{(d_f/d_c)(d_c/D)}{(D_b/D)} \quad (2)$$

where $\epsilon_b$ is bending strain and $d_f$ is a fiber diameter. Thus, it is possible to solve equation (1) for one unknown, provided the other parameters in terms of the ratios, are known. In actuality, mathematically as seen in equation (1) the equation involves an infinite series, but equation (2) represents the bending strain in a closed form and, for practical purposes, is sufficient for determining the optimum core tube size, for example. Equation (1) and (2) can be solved most expeditiously by determining the values of the various ratios on an iterative basis, and then determining the value of D, as will be apparent from the following discussions.

In FIG. 2 there is shown a series of discrete points for various fiber arrangements representing the ratio of $d_f/d_c$ versus the number of fibers to be contained in the core tube, where $d_f$ is fiber diameter. This ratio is one measure of packing density. The points, which are mathematically determinable, are for fiber bundles (LP) and fiber ribbons having four (AR–4f), six (AR–6f), eight (AR–8f), twelve (AR–12f) and sixteen (AR–16f) fibers. The LP points have been joined to produce the single curve shown. From FIG. 2 it can be seen that the fiber bundles give the highest ratio (lowest critical dimension $d_c$) as compared to the ribbon core for a given fiber count, and that smaller count ribbons give a higher ratio than the large count ribbons. The $d_f/d_c$ ratio of buffered fibers involve only two fibers, hence, the value of the ratio is given in FIG. 2 toward the left hand end of the curve, and is controlling in the calculations. Fiber bundles give a higher packing density than ribbon fibers or buffered fibers, as is to be expected for cables of this size. However, as discussed in the foregoing, the core tube must have an inside diameter that gives an acceptable packing density for any of the three fiber configurations shown in FIGS. 1A through 1C. From those figures it can be seen that two buffered fibers are roughly equivalent to eighteen loose fibers arranged in fiber bundles. For eighteen such fibers, it can be seen from FIG. 2 that the value of the ratio $d_f/d_c$ is equal to approximately 0.200 which represents a first approximation of an acceptable packing density, both for the fiber bundles and two buffered fibers.

In FIG. 3 there is shown a graph of excess fiber length in percent versus the ratio $D_b/D$ for three different values of the ratio $d_c/D$, which curves are mathematically determined based upon a sinusoidal model. These curves predict a smaller fiber bend radius ratio for a higher critical dimension ratio than for a lower one. The curves of FIG. 3 demonstrate the effect of the critical dimension $d_c$ on excess fiber length.

The curves of FIG. 3 are especially useful in determining the ratio $D_b/D$ when the desired or practical excess fiber length is known or chosen. Thus, for an excess length of approximately 0.4% and a $d_c/D$ ratio of 0.5, the ratio of $D_b/D$ is approximately equal to 30. That is, for the above parameters, the fiber bend radius is fifteen times the inside diameter of the core tube.

Figure 4:
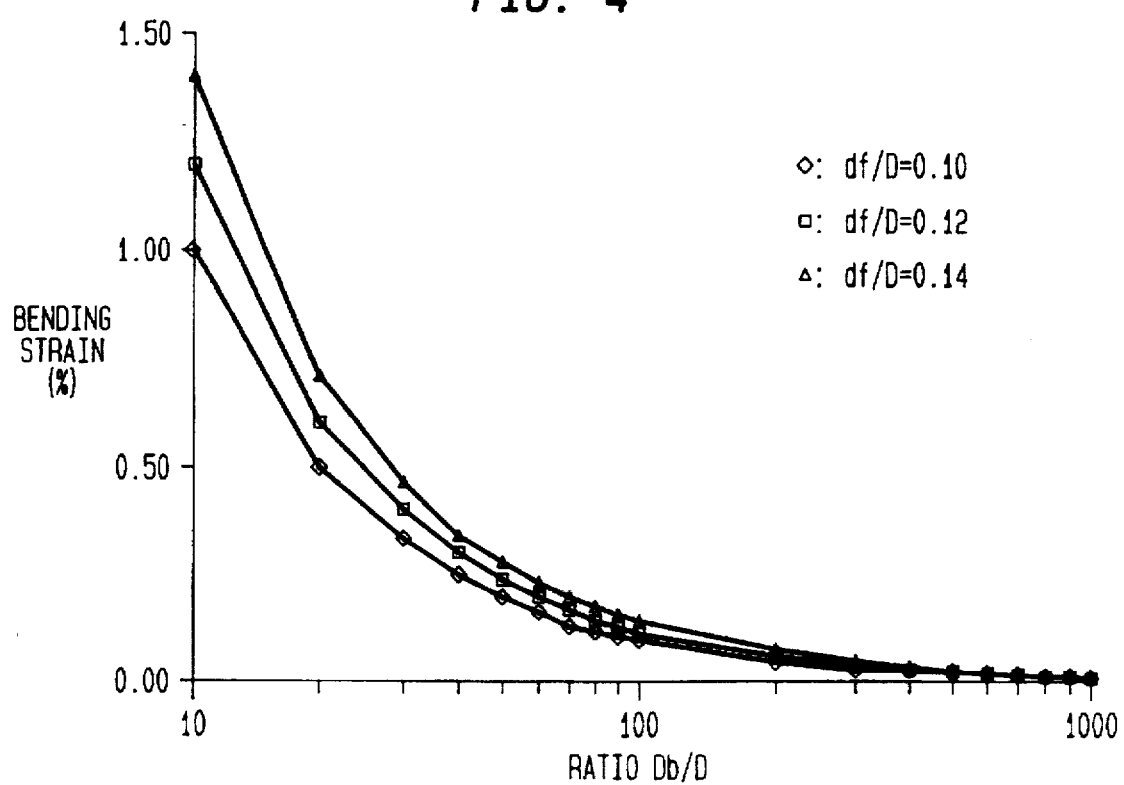

In FIG. 4 there are shown curves representing the bending strain versus the ratio $D_b/D$ for differing values of the ratio $d_f/D$, which have been mathematically determined based on strain due to fiber bending. It can be seen that for the previously determined ratio $D_b/D$ of 30 and a $d_f/D$ ratio of 0.14, the bending strain in percent is approximately 0.45. The characteristics of the fiber to be used, including the relationship of attenuation to bending strain can be determined experimentally and hence, are assumed to be known. Where a bending strain of 0.45% is permissible, equation (2) can now be solved for D, the inside diameter of the core tube. If the bending strain of 0.45% is too high, for example, FIGS. 2 and 3 may be used to ascertain different values for $d_f/d_c$ and $D_b/D$ to bring the percent bending strain to a tolerable figure. Also, a predetermined bending strain may be used in FIG. 4 to determine the values of the ratios $D_b/D$ and $d_f/D$. It can be appreciated that using the curves of FIGS. 2, 3 and 4 is an iterative process which permits variations in excess fiber length and bending strain as well as $D_b$ to insure that they are within tolerable limits. Thus, if a higher bending strain can be tolerated, the required excess length can be increased, or the ratio $D_b/D$ can be reduced. Alternatively, the ratio of $d_c/D$ or the ratio df/D may be changed. The curves of FIGS. 2, 3 and 4 permit a great deal of flexibility in assigning values to the known parameters to determine the optimum core tube inside diameter while insuring that the assigned values fall within acceptable limits to provide the desired optical performance.

In practice, it has been found that determining and optimizing the value of D for the buffered fiber option results in a core tube diameter D that is also optimized for both fiber bundles and ribbon fibers. Thus, a core tube diameter optimized for two buffered fibers is near optimum both as to packing density and excess length for up to eighteen stranded fibers or for the two fiber ribbons of up to six fibers each.

Figure 5:
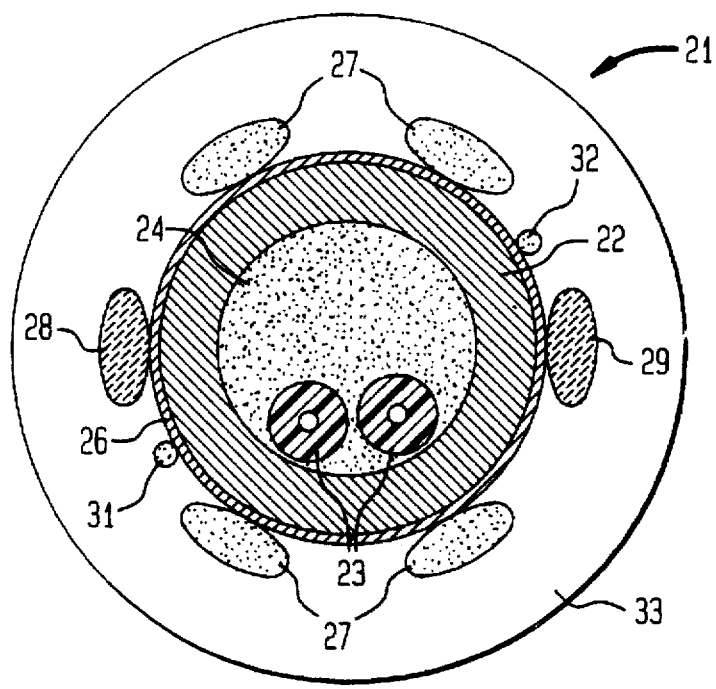
FIG. 5 is a cross-section of a dielectric fiber drop cable embodying the principles of the invention.

In FIG. 5 there is shown a cross-section of a dielectric fiber drop cable 21 embodying the principles of the present invention. Cable 21 comprises a core tube 22 of a polymeric material such as polypropylene sized in accordance with the foregoing discussion and containing two buffered fibers 23,23 each having a diameter of approximately 900 μm. The remaining volume of the interior of core tube 22 is filled with a suitable colloidal gel water blocking material 24 such as, for example, a gel specifically designed for use with optical cables filling compound. Material 24 should not only function to block any water flow within core tube 22 but also should function to maintain buffered fibers 23,23 in a low stress state.

While buffered fibers are shown in the embodiment of FIG. 5, it is to be understood that fiber bundles or fiber ribbons, can be used in place of the buffered fibers, or even in addition to them.

The exterior surface of core tube 22 has a coating 26 of a hydrophilic material which, as discussed hereinbefore, functions to block any water flow along the exterior of core tube 22. The hydrophilic material is in powder form and is applied directly to the exterior surface of core tube 22 so as to adhere thereto sufficient to keep the powder in place. Powder hydrophilic materials are known, examples being cellulosic or starch-graft copolymers, or synthetic superabsorbents which are especially useful because of their microbial resistance. Synthetic superabsorbents include polyelectrolytes and non-electrolytes, the former being preferred. Of the polyelectrolytes, polyacrylic acid and polyacrylonitrite-based materials are the most common. Such materials have been used in the prior art only as the filling in a tape "sandwich" which is wound around the core tube, for example. Unfortunately, where there is an irregular surface about which the tape is wound, it is difficult to achieve a complete water blocking surface. On the other hand, where the hydrophilic powder is applied directly to the surface, as in FIG. 5, substantially complete water blocking is achieved despite surface irregularities, and considerable space is saved.

A plurality of dielectric strength members 27,27 of, for example, a material such as fiberglass are disposed around the circumference of the coated core tube 22 and extend longitudinally thereof in helical or spiral fashion. Strength members 27 are continuous and function to provide tensile strength to the cable assembly. First and second epoxy impregnated fiberglass rods 28 and 29, for example, are disposed on opposite sides of the coated tube 22 and are spiraled along the length thereof to furnish both tension and compression strength. Cable assembly 21 also includes first and second ripcords 31 and 32 of suitable material such as Kevlar® for facilitating access to the core tube 22 and the fibers 23,23 contained therein. The assembly as discussed thus far is coated with hydrophilic material (not shown) and is then encapsulated in a jacket 33 of suitable insulting material, such as a medium density polypropylene. The ripcords 31 and 32 provide easy fiber access by ripping jacket 33 when pulled.

One of the advantages of a dielectric fiber drop cable is that it has no metallic surfaces that require grounding. Where grounding or the like is not a consideration, and where greater cable strength or ruggedness is required, an armored fiber drop cable 34, as shown in FIG. 6 can be used.

Figure 6:
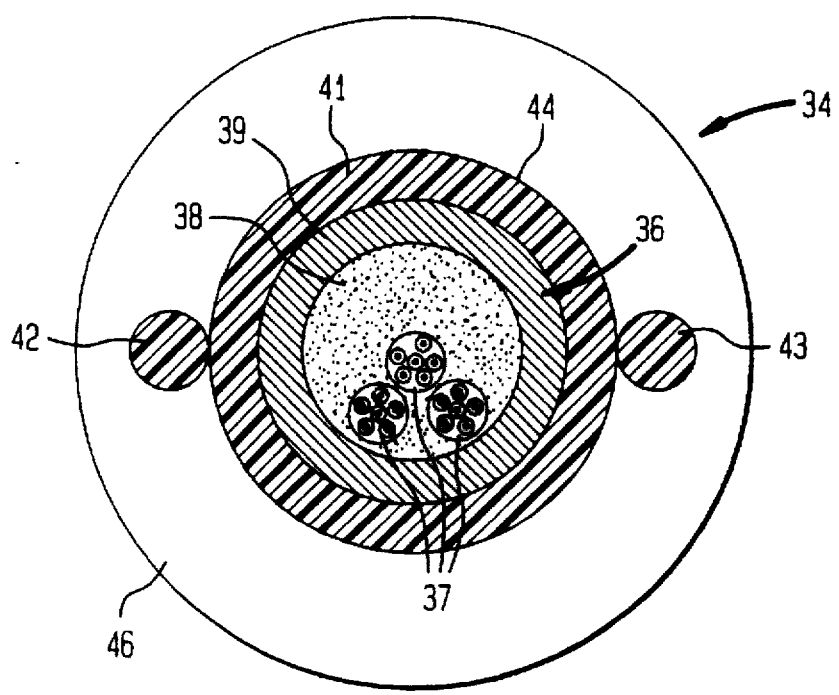
FIG. 6 is a cross-section of an armored fiber drop cable embodying the principles of the invention.

The low fiber count armored drop cable 34 of FIG. 6 comprises a core tube 36 which is preferably the same as core tube 22 of FIG. 5, having been optimized as discussed in the foregoing for the buffered fiber option. Tube 36 carries therein eighteen stranded fibers of 250 microns diameter in three bundles 37,37. The remainder of the interior volume of tube 36 is filled with a suitable water blocking colloidal gel 38, similar in all respects to gel 24 of FIG. 5, for example. As with the cable of FIG. 5, the fibers within the core tube 36 may be in the configuration of buffered fibers or ribbon fibers also. The exterior surface of core tube 36 is coated with a thin coating 39 of hydrophilic material which preferably is the same as that used for the dielectric drop cable 21 of FIG. 5, and the core tube 36 and coating 39 are enclosed in an armored sheath 41 of a suitable material such as electrolytically chrome coated steel (ECC5). Two linearly extending metallic wire strength members 42 and 43 are provided, and, together with sheath 41 provide, for example, a four hundred (400) pound or greater tensile load rating which meets the requirements for most installation methods. The sheath 41 and strength members 42 and 43 are coated with a thin layer 44 of hydrophilic material and the entire assembly is encased in a dielectric jacket 46 of, for example, medium density polyethylene. Although not shown, rip cords may be provided in the manner shown in FIG. 5 for easy access to the core tube and the fiber contained therein. The cable 34 of FIG. 6 has excellent bending flexibility, ease of access, and is sufficiently rugged to withstand field handling and use.

Both the dielectric cable 21 of FIG. 5 and the armored cable 34 of FIG. 6, using the optimized core tube can be used with the various options discussed in the foregoing, i.e., individual coated fibers, reinforced or buffered fibers, or small ribbons. Their small size and weight 9.1 mm diameter and 92 kg/km for armored cables, and 7.6 mm diameter and 45 kg/km for the dielectric cable, for example, their flexibility make them especially attractive for use in those applications where small numbers of fibers are dropped from larger cables. They are compatible with complete systems of fiber optic closures, connectors, and splicing arrangements that provide end-to-end connectivity from the distribution or feeder cable to the point of opto-electrical conversion.

Figure 7:
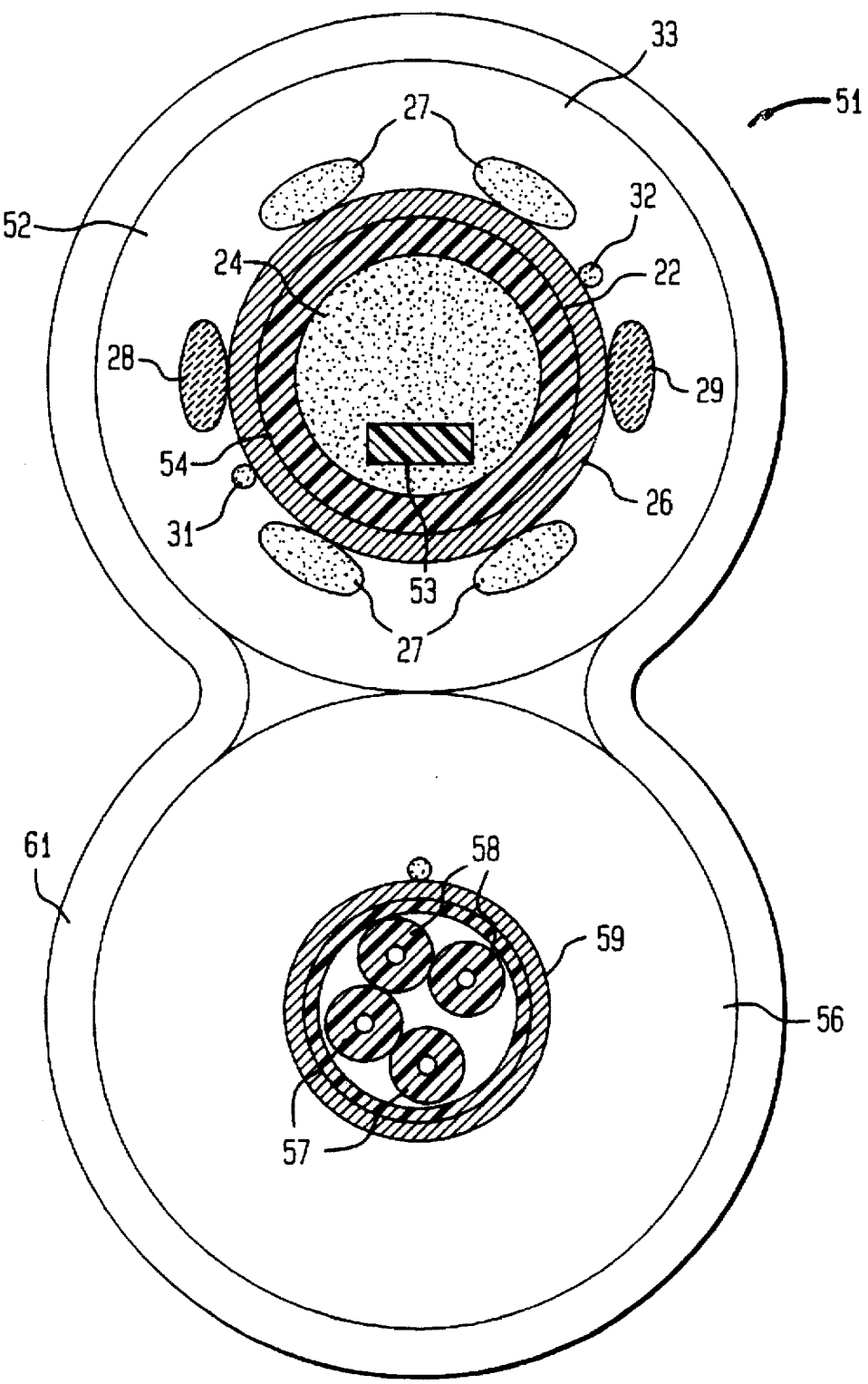
FIG. 7 is a cross-section of a composite fiber drop cable embodying the principles of the invention.

In FIG. 7 there is shown a composite drop cable 51 for use in those situations where electrical signals as well as optical signals are to be dropped from the feeder to, for example, the customer premises. Cable 51 comprises an optical drop cable 52 of the type shown in FIGS. 5 or 6, and shown here as having ribbon fibers 53 within the optimized core tube 54. Inasmuch as cable 52 is the dielectric drop cable 21 of the FIG. 5, the same reference numerals have been used for the same components thereof. It is to be understood, of course, that the armored drop cable 34 of FIG. 6 can be used in place of cable 21, although in most applications the dielectric drop cable is preferred.

As shown in FIG. 7, a copper cable 56 containing twisted copper wire pairs 57 and 58 enclosed within a metallic core tube 59 and encased within a polyvinylchloride (PVC) jacket is coextensive and in contact with the jacket 33 of cable 52. The two cables 52 and 56 are encased in a jacket or sheath 61 of, for example, low density polyethylene and the entire assembly forms the composite cable 51. It is to be understood that various other types of electrically conducting cables can be used instead of that shown in FIG. 7, including, for example, coaxial cable. If necessary, a suitable water blocking yarn may be used in the empty spacer.

The "FIG. 8" configured cable 51 in FIG. 7 provides the capability to install the optical/electrical media as an integrated unit, thus saving in system installation costs while allowing for easy separation of the two individual cables for termination. This latter feature allows the use of standard terminating equipment such as standard grips and grommets.

In the foregoing, there has been shown and described a comprehensive family of fiber optic low fiber count drop cables based upon a standardized core tube optimized in size for use with any of several optical fiber options. These cables offer both choice and flexibility for the last optical link in a network, whether it is a link to an optical network unit at the curb in a residential neighborhood, to a video node in a CATV feeder, or to a residence. The cables are small, lightweight, and flexible and, by virtue of the optimized universal core tube and the elimination of water blocking tape, are relatively economical to manufacture and install.

The principles and features of the present invention have been disclosed in the several preferred embodiments discussed hereinbefore. Numerous changes, alterations, or adaptations may occur to workers in the art without departure from the spirit and scope of the invention.

We claim:

1. A low fiber count optical fiber cable comprising:

a hollow tubular member of dielectric material and substantially circular cross section having an inside diameter D;

the exterior surface of said tubular member being coated with a hydrophilic material;

at least one optical fiber configuration enclosed within said tubular member and having a diameter of $d_f$;

said inside diameter D being sized for containing one or more of a plurality of any of said fiber configurations and being greater than a critical dimension $d_c$ where $d_c$ is that value of D just sufficient to enclose all of the fiber within said tubular member;

said fiber member having a length within said tubular member that is greater than the length of said tubular member by an excess length $l_e$ and is given in part by the ratio $d_f/D$, and a bend radius within the tubular member given by the ratio $D_b/D$, where $D_b$ is twice said bend radius;

said ratio $d_f/D$ and the value of $D_i$ and of $l_e$ being an optimum value regardless of the type of fiber configuration enclosed within said tubular member; and wherein at the optimum value of D, a maximum packing density commensurate with excellent optical and mechanical performance including low bending strain and low attenuation within said tubular member results for supporting any of said fiber configurations.

2. A low fiber count optical fiber cable as claimed in claim 1 wherein the critical dimensions $d_c$ is that for two buffered fibers and the dimension D is an optimum for two buffered fibers contained within said tubular member.

3. A low fiber count optical fiber cable as claimed in claim 2 wherein said tubular member contains three fiber bundles of six fibers per bundle.

4. A low fiber count optical fiber cable as claimed in claim 2 wherein said tubular member contains at least one fiber ribbon having a plurality of fibers therein.

5. A low fiber count optical fiber cable as claimed in claim 1 wherein said hydrophilic material is in powder form.

6. A low fiber count optical fiber cable as claimed in claim 1 wherein the excess fiber length $l_e$ is related to the diameter D and the critical diameter $d_c$ by $$l_e = 100[(1 + k^2)^{1/2}\{1 - p\} - 1]$$

$$\text{where } p = \frac{1}{4} q^2 + \frac{3}{64} q^4 + \frac{1}{256} q^6 + \ldots$$

$$\text{where } q^2 = \frac{k^2}{1 + k^2}$$

$$\text{and } k^2 = \frac{1 - (d_c/D)}{D_b/D} \ .$$

7. A low fiber count optical fiber cable as claimed in claim 1 wherein the interior of said tubular member is filled with a water blocking compound.

8. A dielectric low count optical fiber drop cable comprising:

a core tube having an inside diameter D;

at least two optical fibers of any of a plurality of fiber configurations within said core tube having a total diameter $d_f$; said fiber having an excess length $l_e$;

said inside diameter D sized for containing one or more of a plurality of any of said fiber configurations and being greater than a critical diameter $d_c$ which is the minimum diameter sufficient to encompass all of said optical fibers, and having a value wherein a packing density within said core tube supports any of said fiber configurations;

the outer surface of said core tube being coated with a hydrophilic powder material;

first and second diametrically opposed dielectric strength members extending along the length of said core tube in a helical configuration and in contract with said hydrophilic coating material;

a plurality of longitudinally extending dielectric tensile strength members in helical configuration about said core tube and in contact with said hydrophilic coating material;

said first and second strength members and said tensile strength members being coated with hydrophilic powder material; and a dielectric jacket member enclosing said core tube and said strength members and being in contact with said hydrophilic material.

9. A dielectric optical fiber drop cable as claimed in claim 8 and further comprising an electrically conducting cable member having an exterior dielectric jacket, said exterior dielectric jacket being in contact with said dielectric jacket of said fiber drop cable; and a sheath of dielectric material encasing said dielectric drop cable and said electrically conducting cable member to form a FIG. 8 configuration.

10. A dielectric optical fiber drop cable as claimed in claim 9 wherein said electrically conducting cable member contains twisted pairs of conductors.

11. A dielectric optical fiber cable as claimed in claim 9 wherein said electrically conducting cable member is a coaxial cable.

12. A dielectric optical fiber drop cable as claimed in claim 8 wherein said optical fibers are in the configuration of one or more fiber ribbons, each ribbon having a plurality of fibers therein.

13. A dielectric optical fiber drop cable as claimed in claim 8 wherein the unoccupied volume of the interior of said core tube is filled with a water blocking compound.

14. A dielectric optical fiber drop cable as claimed in claim 8 wherein the length of the fibers in said core tube exceeds the length of said core tube by a percentage given by the expression $$l_e = 100[(1 + k^2)^{1/2}\{1 - p\} - 1]$$

$$\text{where } p = \frac{1}{4} q^2 + \frac{3}{64} q^4 + \frac{1}{256} q^6 + \ldots$$

$$\text{where } q^2 = \frac{k^2}{1 + k^2}$$

$$\text{and } k^2 = \frac{1 - (d_c/D)}{D_b/D} \ .$$

15. A dielectric optical fiber drop cable as claimed in claim 8 wherein said optical fibers are in the configuration of three bunches of six optical fibers per bunch.

16. A dielectric optical fiber drop cable as claimed in claim 8 wherein said optical fibers are in the configuration of two buffered fibers.

17. An armored low count optical fiber cable comprising:

a core tube having inside diameter D;

at least two optical fibers of any of a plurality of fiber configurations within said core tube having a total diameter $d_f$; each fiber being an excess length $l_e$;

said inside diameter D being sized for containing one or more of a plurality of any of said fiber configurations and being greater than a critical diameter $d_c$ which is the minimum diameter sufficient to encompass all of said optical fibers and compatible for use with any of said configurations;

the outer surface of said core tube being coated with a hydrophilic powder material;

a sheath of metallic material surrounding said core tube in contact with said hydrophilic material;

first and second diametrically opposed metallic strength members extending along the length of said core tube in contact with said metallic sheath;

said first and second strength members and said metallic sheath being coated with a hydrophilic powder material; and a dielectric jacket encasing said sheath member.

18. An armored optical fiber drop cable as claimed in claim 17 and further comprising an electrically conducting cable member having an exterior dielectric jacket being in contact with said dielectric jacket encasing said sheath; and a sheath of dielectric material encasing said armored drop cable and said electrically conducting cable member to form a FIG. 8 configuration.

19. An armored optical fiber drop cable as claimed in claim 18 wherein said electrically conducting cable member contains twisted pairs of conductors.

20. An armored optical fiber drop cable as claimed in claim 18 wherein said electrically conducting cable member is a coaxial cable.

21. An armored optical fiber drop cable as claimed in claim 17 wherein said optical fibers are in the configuration of a plurality of fibers arranged in bundles of several fibers per bundle.

22. An armored optical fiber drop cable as claimed in claim 17 wherein the unoccupied volume of the interior of said core tube is filled with a water blocking compound.

23. An armored optical fiber drop cable as claimed in claim 18 wherein the length of the fibers in said core tube exceeds the length of said core tube by a percentage given by the expression $$l_e = 100[(1 + k^2)^{1/2}\{1 - p\} - 1]$$

$$\text{where } p = \frac{1}{4} q^2 + \frac{3}{64} q^4 + \frac{1}{256} q^6 + \ldots$$

$$\text{where } q^2 = \frac{k^2}{1 + k^2}$$

$$\text{and } k^2 = \frac{1 - (d_c/D)}{D_b/D} .$$

24. An armored optical fiber drop cable as claimed in claim 17 wherein said optical fibers are in the configuration of two buffered fibers.

25. An armored optical fiber drop cable as claimed in claim 17 wherein said optical fibers are in the configuration of one or more ribbons each having a plurality of fibers therein.

26. For use in forming a low count optical fiber drop cable having a core tube of inside diameter D, two or more optical fiber members of total outside dimensions $d_f$ contained within the core tube of a length greater than the core tube, the core whereby the fibers have a bend radius given by $D_b/2$, and a critical dimension $d_c$ diameter of the core tube sufficient to encase the fibers;

the method of optimizing the diameter D such that one or more of a plurality of any said fiber members can be contained therein comprising;

determining the packing density ratio $d_f/d_c$ for two buffered fibers;

determining the excess fiber length relative to the core tube;

determining from the excess fiber length the ratio of $d_c/D$ and the ratio $D_b/D$;

determining the fiber bending strain $\epsilon_b$ from the expression $$(d_f/d_c)(d_c/D)$$

$$\epsilon_b(\%) = 100 \ (D_b/D)$$

varying the values of the ratios to produce an acceptable fiber bending strain; and solving for D once an acceptable bending strain is achieved, said inside diameter D being sized to result in an allowable packing density for supporting said members other than said buffered fibers.

* * * * *